United States Patent [19]
Gordon

[11] 3,975,611
[45] Aug. 17, 1976

[54] TRIM FASTENING

[75] Inventor: Stanley H. Gordon, Winchester, Mass.

[73] Assignee: TRW Inc., Cleveland, Ohio

[22] Filed: Dec. 1, 1969

[21] Appl. No.: 881,044

[52] U.S. Cl. .................................. 219/98; 219/72; 219/99
[51] Int. Cl.[2] ......................................... B23K 11/04
[58] Field of Search .................. 219/96, 97, 98, 99, 219/105, 107, 72, 93; 161/120, 121, 124, 40; 204/30

[56] References Cited
UNITED STATES PATENTS

| | | | |
|---|---|---|---|
| 2,110,832 | 3/1938 | Hogg et al. | 219/98 |
| 2,506,747 | 5/1950 | Smith | 219/99 |
| 2,612,394 | 9/1952 | Nelson | 219/99 X |
| 3,038,989 | 6/1962 | Moerman | 219/99 |
| 3,233,073 | 2/1966 | Ruetschi | 219/93 |
| 3,257,539 | 6/1966 | Kazakov | 219/72 |
| 3,340,379 | 9/1967 | Sweeney | 219/99 |
| 3,430,338 | 4/1969 | Flaherty | 219/99 |
| 3,471,355 | 10/1969 | Truesdell et al. | 161/40 |
| 3,488,466 | 1/1970 | Poupitch | 219/98 |
| 3,489,878 | 1/1970 | Weiland | 219/98 |
| 3,514,378 | 5/1970 | MacDougall et al. | 204/30 |

OTHER PUBLICATIONS
"The Nelson Electric Arc Welder" pamphlet, Nov. 22, 1946.

*Primary Examiner*—Arthur T. Grimley
*Assistant Examiner*—D. A. Tone
*Attorney, Agent, or Firm*—James R. O'Connor

[57] ABSTRACT

An article of manufacture having a synthetic, thermoplastic substructure, a metallic plating on the external surface of the substructure, and a metallic stud joined to the article in contact with the plating, is adapted to be electrically welded to a metallic supporting structure, whether or not the surface of the structure to which the article is to be welded is coated with an electrically nonconductive material, and a sealing of the area of the structure adjacent the welded joint is effected during the welding operation, with the material forming the seal having derived from the body of the substructure.

The welding is accomplished by applying a load to the article, preferably by creating a vacuum about the article and the confronting surface of the supporting structure, to press the stud into effective metal-to-metal contact with the structure, and while maintaining the load applying a heating current from a supply electrode to the metallic plating on the article, which current traverses the conductive path from the plating through the stud and to the supporting structure's surface and precipitates a molten pool of metal at the interface of the stud and the structure, which pool solidifies into an autogenous joint when the current flow is subsequently interrupted.

39 Claims, 8 Drawing Figures

TRIM FASTENING

BACKGROUND OF THE INVENTION

1. Field of the Invention

The invention relates to articles of manufacture which are adapted to be electrically welded to a supporting structure, the method of construction of such articles and the method of welding the articles to a supporting structure, particularly articles having a synthetic thermoplastic substructure and an external metallic plating on the substructure.

2. Description of the Prior Art

The subject matter of this disclosure is considered to have application in various of the industrial arts including but not limited to the manufacture of automotive vehicles, business and domestic appliances, electronic data processing equipment, and many others, some of which remain unforeseen at this time. However, it would appear to be important that those who would subsequently employ the teachings of the disclosure understand that the principal motivating force behind the development of the product and processes disclosed was the recognition of a need in the automobile industry for an improved method and a product adapted for application by the method which would result in more efficient and less expensive procedures for attaching ornamental devices, articles of indicia, moldings, etc. (all of which can be generally classified as "trim") to exterior body panelling.

In the art of trim attachment it has long been the practice to employ various fastening means including screws, bolts and nuts to secure the trim to perforated body paneling. Snap fasteners of various types have also been utilized with apertured panels.

More recently, with a view to eliminating perforation of the paneling, so-called "no-hole" fastening systems have been introduced to the art. The basic component of the best known and most widely used of these systems is a very small, headed stud which is welded (usually by arc welding or so-called "capacitor discharge" welding) to an exterior body panel either before or after painting and finishing of the panel. A separate adapter, which is usually of either spring metal or resilient synthetic plastic construction is utilized as the coupling member for securing trim to the welded stud. Depending on the type of adapter utilized, it may be preassembled with the trim and that subassembly later engaged with the stud, for example, by snapping the adapter over the stud head, or in the alternative by first attaching the adapter to the stud and thereafter snap engaging the trim and the adapter.

Trim formed from various sheet or die-cast metals has been secured by the aforementioned fastening methods and systems, and I am aware of experimental attempts to weld sheet metal of die-cast trim directly to body panelling, absent the utilization of specific welding elements in conjunction with such trim; but I am not aware that the latter approach to the problem has ever provided a solution which was considered satisfactory for commercial implementation.

The last decade has seen the development and perfection of a number of processes for applying decorative metallic plating to molded and extruded synthetic plastic parts. For a number of reasons including reduced weight and cost, the automotive and appliance industries have replaced sheet and die-cast trim in both internal and external installations with plated plastic trim. In automobiles such parts are used internally as outliners for instrument clusters, control knobs, door handles, door lock knobs, identification logos, coat hooks, etc. Externally, plated plastic trim has replaced sheet and die-cast metallic parts for decorative moldings, model and manufacturers identification names and symbols, dealer advertizing plates, etc. However, there has been no substantial advance in the art of fastening external trim in that screws, bolts and nuts, snap fasteners, no-hole studs and adapters and adhesives continue to be utilized to attach the plated plastic trim in much the same manner and degree as those systems and methods were used with sheet and die-cast metal trim. It is not the intention of the foregoing remarks to convey the impression that the aforementioned fastening methods and systems are totally without merit, but it is significant to note that each has certain disadvantages and deficiencies, the elimination of which constituted the challenge which motivated and gave impetus to the improvements in the art disclosed herein.

The disadvantages of utilizing screws, nuts and bolts, snap fasteners or other fastening means which required the prepunching of fastener receiving holes in body panelling are elaborated upon in considerable detail in U.S. Pat. Nos. 3,153,468 and 3,188,731 to which reference may be had. The above mentioned patents and U.S. Pat. No. 3,340,379 relate to the earlier mentioned no-hole fastening systems and the inventions disclosed therein are quite generally recognized as having made a definite contribution to the art of trim attachment. However, it is a principal object of the present invention to advance the art still further by providing a more efficient and less costly system, as well as a system which encourages greater utilization of metallically plated plastic trim, both internally and externally in dynamic as well as static installations. To that end the present invention: (a) eliminates the need for the various special adapters which are characteristic of the known no-hole systems; (b) permits the attachments of decorative trim at the most opportune time in an automotive mass production cycle; (c) simplifies trim attachment in that the piece and welding element constitute a unit which is simultaneously secured to the body panelling; (d) reduces the cost of installation equipment in that multiple welding heads arranged in various predetermined patterns for the premounting of studs are no longer required; (e) provides a system wherein special sealing components for corrosion prevention in the area of the weld are no longer required; (f) contributes to a simplification of the manufacturer's inventory control and material flow systems in that the problems inherent in insuring that particular panelling having the requisite number of preattached studs in the desired predetermined pattern are consistently available at the trim installation station of a production line are substantially reduced; and (g) provides for the rapid attachment of trim to finished (e.g. painted) panelling in a manner which satifies industry's standards relative to ultimate strength and durability in the fastening, protection against corrosion and over-all attractiveness of the assembly.

Additional improvements which the invention contributes to the art of trim attachment will become evident from a consideration of the detailed description of the invention which follows hereafter in conjunction with a viewing of the accompanying drawing.

SUMMARY OF THE INVENTION

The invention relates to the combination of a trim member having a metallic surface capable of conducting a high amperage electric current and a welding element joined to the member in current carrying contact with its metallic surface. The welding element is particularly adapted for making effective electric current carrying contact with a metal panel or other metallic structure when the element is pressed against such a structure. Thus, electric current from a supply electrode placed in contact with the surface of the trim member will flow through the surface of he member to the welding element and the panel, and an electrical welding of the member to the panel may be effected. In the particular trim member disclosed, the member comprises a substructure of molded, synthetic thermoplastic material having a metallic plating on its outer surface. The welding element is a solid metal stud having one end seated in a cavity in the plastic substructure and embodying a flange or projection which overlies a portion of the metallic plating. During the welding operation, a load is placed on the member to press the opposite end of the stud into metal-to-metal contact with the panel (the said opposite end being designed to pierce and radially disperse a nonconductive coating, for example paint or decorative vinyl, if the adjacent surface of the panel is thus coated) and the current is applied while maintaining the trim member under load. Thus, the plastic material of the substructure in the vicinity of the seated stud is heated and rendered molten during the period of current flow and the flange or projection on the stud is pressed into the body of the substructure under the continuing influence of the load and precipitates a cracking or fissuring of a localized area of the metallic plating. The molten plastic of the substructure is thereby forced outwardly through the cracks or fissures in the plating and flows radially in what might be termed a ring configuration about the welded joint at the interface of the opposite stud end and the panel. When the current is interrupted either deliberately or by reason of the circuit breaking due to the rupturing of the plating, the molten plastic cools and resolidifies to form a seal about the weld joint and thereafter inhibits corrosion of the panel in the area thereof adjacent the weld.

DESCRIPTION OF A PREFERRED EMBODIMENT

For purposes of illustration only, the particular trim member which has been selected for the requisite detailed description is a stylized letter "O" which might, for example, be fixed to exterior body panelling as part of a symbol to identify a particular automobile model line.

The stylized letter O or trim member 1 includes a molded, synthetic thermoplastic substructure 2 and an external metallic plating 3 which covers the outer surfaces of the substructure. While it is anticipated that the substructure 2 might be molded from any of a number of suitable thermoplastics which are conductive to subsequent metallic plating and depending on the particular properties desired in a given trim piece as dictated by end use requirements, tests conducted to date indicate that the synthetic resin acrylonitrile-butadiene-styrene, commonly referred to as ABS, which is characterized by high impact and tensile strength, rigidity and hardness coupled with resistance to chemical attack and excellent resistance to distortion under heat and load, particularly lends itself for use as the base material of the substructure. The plating 3 consists of successive layers of copper, nickel and chrome of approximately equal thickness with the copper layer being disposed adjacent the outer surface of the plastic substructure. It is envisioned that the plating might be constituted of metals other than those above mentioned, but the plating should possess the capacity for conducting an electric current of sufficiently high amperage to effect a weld. The ABS substructure 2 is molded with a pair of cavities 4 therein, each of which has an open end 5 adjacent the undersurface 6 of the substructure. The cavities are generally cylindrical and each is countersunk to provide a portion 7 of maximum diameter adjacent the open end and a portion 8 of reduced diameter extending inwardly therefrom to the base 9 of the cavity whereby a narrow ledge 10 is formed slightly inwardly from the open end of the cavity. A plurality of circumferentially spaced nibs 11 are formed on the wall portion 8 of the cavity. The nibs 11 extend axially from adjacent the ledge 10 toward the base 9 of each cavity and project radially inwardly for a slight distance toward the central axis of each cavity. The internal walls of the substructure defining the cavities 4 and the nibs 11 are coated with successive layers of copper, nickel and chrome during the plating of the trim piece.

Figures 1, 2:
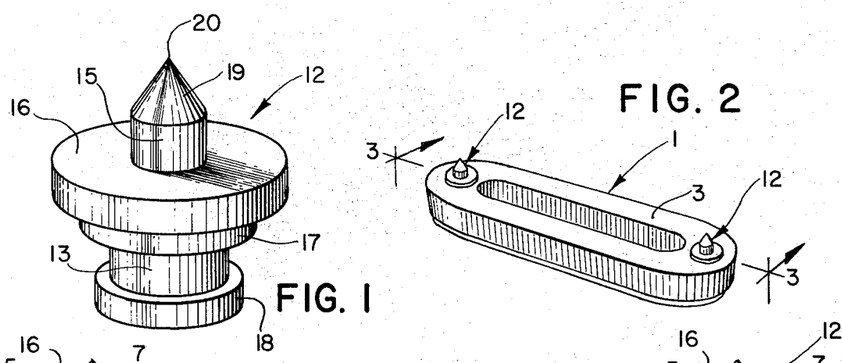
FIG. 1 is an enlarged perspective view of a welding element or stud according to the invention.
FIG. 2 is an enlarged perspective view of a trim member having a pair of the welding studs shown in FIG. 1 seated therein.

The stud 12, which is best depicted in FIG. 1, is of solid metal construction, for example, low carbon steel, is substantially cylindriform in configuration and includes what might be best termed a central core having a first portion 13 of greater diameter and a second portion 15 of lesser diameter, a first flange 16 of greatest diameter circumscribing the core and projecting radially therefrom adjacent the core portion 15, a second flange 17 of lesser diameter than the flange 16 circumscribing core portion 13 and projecting radially therefrom and being disposed adjacent the surface of flange 16 (hereinafter referred to as its undersurface) most remote from core portion 15, a third flange 18 disposed at one end of the stud and being of lesser diameter than flanges 16 and 17 and circumscribing and projecting radially from core portion 13 and being axially spaced from the flange 17, and a leading end 19 having a generally conical configuration and tapering in said configuration from core portion 15 to a sharply pointed terminus 20.

Figures 3, 4, 5, 6, 7:
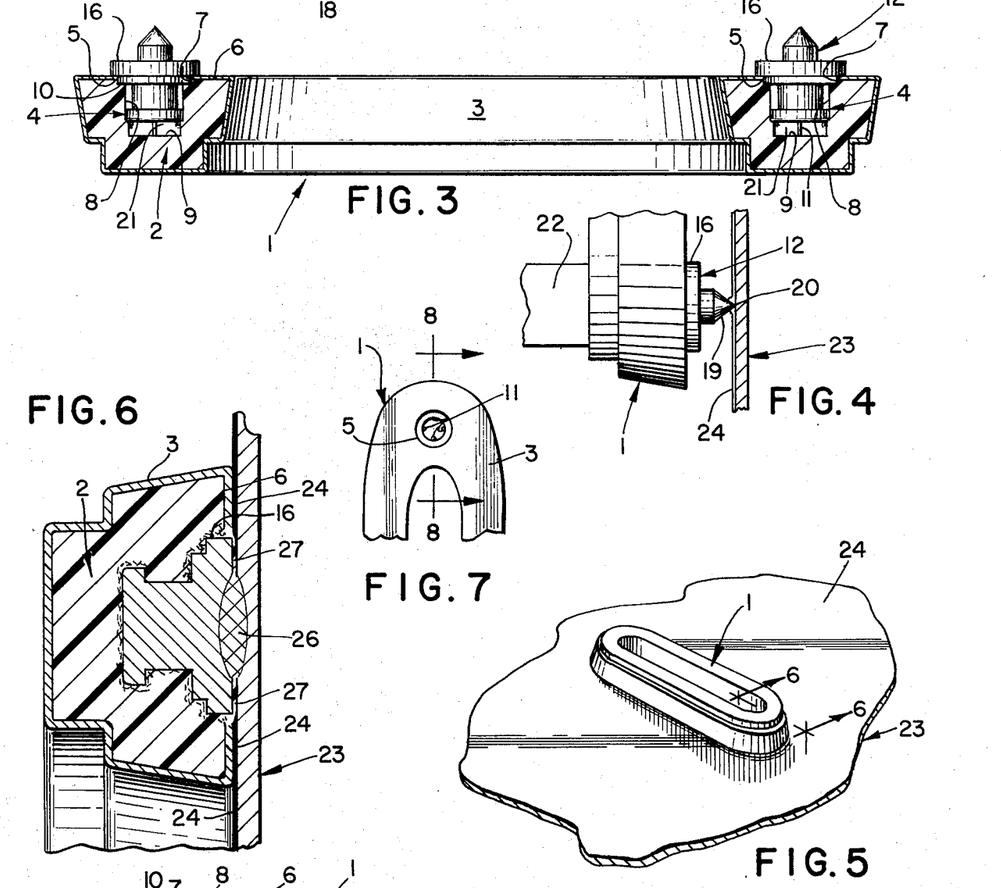
FIG. 3 is an enlarged cross section taken on line 3—3 of FIG. 2.
FIG. 4 is a partial side elevational view of the trim piece depicted in FIG. 2 and a fragmentary sectional view of a painted, metal panel showing the free end of the welding stud piercing the paint and establishing effective metal-to-metal contact with the panel. This figure depicts the first step in the welding process according to the invention, that is when the trim member and stud are placed under axial load to press the leading end of the stud against a structure to which it is to be welded. The figure also shows a partial schematic view of an electric current supply electrode in contact with the trim member.
FIG. 5 is a perspective view of an installation depicting the trim member welded flush against the painted surface of a fragmentary section of a supporting panel.
FIG. 6 is an enlarged cross section taken on line 6—6 of FIG. 5.
FIG. 7 is a fragmentary bottom plan view of a trim member according to the invention prior to insertion of the welding studs.
Figure 8:
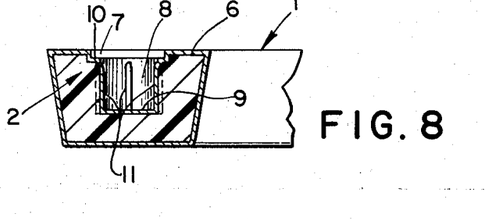
FIG. 8 is a cross section taken on line 8—8 of FIG. 7.

The trim member 1 is depicted to scale in FIG. 6, approximately twice size in FIG. 2, and approximately four times size in FIG. 3. Since a knowledge of the actual dimensions of the components heretofore described is not considered critical for an understanding of the invention, it is deemed sufficient to point out that the length and thickness of the letter are approximately 1.5 and 0.25 inches, respectively, the over-all length of the stud is approximately 0.200 inch and the diameter of the stud flange 16 is approximately 0.200 inch.

Reference should now be had particularly to FIGS. 2 and 3 which depict the trim member or letter 1 having a stud 12 seated in each of the cavities 4. The studs are retained therein in what might be best termed a press-fit condition. The external dimensions of the various portions of the stud and internal dimensions of the various portions of the cavity are carefully predetermined. The diameter of the stud flange 18 is approximately equal to or slightly greater than the diameter of the cavity portion 8 so that in the assembled condition the peripheral edge of the said flange is tightly butted against the adjacent wall of the cavity and there is a circumferential gap between the core portion 13 of the stud and the adjacent wall of the cavity. The diameter of the stud flange 17 is approximately equal to the diameter of the cavity portion 7 so that the peripheral edge of the said flange is tightly butted against the adjacent wall of said cavity portion and the surface of the said flange adjacent core portion 13 overlies and is pressed against the ledge 10. The diameter of the stud flange 16 is greater than the diameter of the cavity at its open end, and thus the undersurface of the said flange overlies and is butted against the surface area of the plating 3 adjacent the open end of the cavity. The over-all depth of the cavity and the length of the stud from the undersurface of the flange 16 to the end of the stud opposite terminus 20 are selectively predetermined so that there is a gap 21 between the undersurface of the flange 18 and the base 9 of the cavity. The depth of the gap 21 is approximately equal to the thickness of the flange 16. During the insertion of the studs into the cavities the lower peripheral edge of the flange 18 shears away portions of the nibs 11 and the plating thereon to expose portions of the underneath plastic substructure for a purpose to be explained hereinafter. The residue of sheared metal and plastic is deposited in the base 9 of each cavity.

From the foregoing description of the relative position of the seated studs and the various dimensional relationships between the studs and the cavities, the reader will appreciate that good metal-to-metal contact between the studs and the plating is achieved, particularly at the interface of the undersurface of the flanges 16 and the plating adjacent the open ends of the cavities. One will further appreciate that the reliance on a tight press-fit connection to couple the components is particularly attractive from the point of view of ease of assembly in that additional fastening means are not required and that the assembly can readily be accomplished utilizing relatively simple, automatic component feeding and stud inserting equipment. It also becomes evident that the assembled trim members and studs can be packaged, shipped, stored, and transported to an assembly line station as self-contained units ready for installation in the welding apparatus absent the need for any intermediate adjustment or special handling of the components per se relative to one another.

In the process of reducing my invention to practice, I have to date employed a welding technique which is known as resistance or resistance projection welding. However, I anticipate that my invention may now be or ultimately prove to be adaptable for application by various other welding techniques presently known to those skilled in the art or even new welding techniques developed hereafter.

I also anticipate that whether the resistance welding technique or some other welding technique is employed, various mechanisms and apparatus presently known or later developed might be utilized.

The apparatus I am currently utilizing consists of a fixture having a socket contoured to receive and retain the trim member 1 with the back face of the letter disposed in the socket and the studs 12 directed outwardly therefrom. A current supply electrode 22 which is mounted by a sealed connection in the base of the socket establishes contact with the plating on the back face or upper surface of the letter. The electrode is connected by appropriate leads to an electrical energy source (hereinafter referred to as "the welder"). The forward outer rim of the fixture carries a urethane rubber skirt which circumscribes and extends beyond the front end of the fixture and in effect acts as a suction cup as will be further described hereinafter. A hose from a vacuum pump is connected by an airtight fitting to a through orifice in the electrode.

To effect the attachment of the trim member 1 to a body panel 23 having a painted surface 24, a non-painted area of the panel is connected to ground potential and the fixture carrying the trim piece in its socket is moved against the panel so that the urethane skirt or suction cup lies flush against the painted surface. The pump is then energized and air is evacuated from the internal confines of the fixture and suction cup. The vacuum thus created precipitates a rapid snaplike movement of the fixture toward the confronting surface of the panel and causes the leading terminus 20 of each stud to penetrate the paint and establish effective electrical and thermal metal-to-metal contact with the panel. The full load on the depicted trim piece resulting from the creation of the vacuum is approximately 120 lbs. or 60 lbs. per stud. When this full load condition, as depicted in FIG. 4, is reached, a sensing mechanism which is part of my apparatus automatically activates a vacuum switch whereby an alternating current of approximately 5000 amps is transmitted from the welder to the electrode 22. This high intensity current, which is maintained for three cycles or about 1/20 of a second, flows from the electrode through the plating to the stud termini 20 and precipitates an immediate hot melt at the interface of the leading ends of the studs and the panel areas adjacent thereto. Due to the conical configuration of the leading end 19, and the greater mass in the core portion 15 of the stud, the heat build-up is gradual, relatively speaking, from the area of maximum resistance at the terminus 20 back through the conical end and core portion 15 which provides a gradually lessening resistance. Consequently, the forward portions of the stud melt progressively while heat is being generated in the flange 16 and the remaining portions of the stud seated in the trim member. As the forward portions of the stud melt, the trim piece moves further toward the surface of the panel under the continuing force of the load and the heating of the remaining portions of the stud causes a simultaneous heating of the plating adjacent the undersurface of the flange 16 and the internal plating in each cavity adjacent the stud, as well as a localized heating and melting of the thermoplastic substructure beneath the plating in the aforesaid areas. After three cycles of current flow at 5000 amps, the current is automatically cut off for a period of one or two cycles (about 1/30 of a second) of cooling time to insure that the thermoplastic beneath the heated plating does not boil and burst through the plating. When the brief cooling period has elapsed, current is automatically reapplied at a lower intensity on the order of 2000 amps for approximately an additional six cycles and then cut off. This lower intensity current causes additional heating of the plating adjacent the stud and the plastic adjacent thereto and the plating and plastic adjacent the stud are so weakened that the stud, under the continuing influence of the load on the trim piece, subsequently plunges into the cavity until the end of flange 18 bottoms on the base 9 of the cavity. As the stud plunges, flanges 16 and 17 break through the plating adjacent the open end of the cavity and thereby cause a localized fracturing or fissuring of the plating. Once the plating is cracked, portions of the molten plastic of the substructure are squeezed outwardly through the fissures and proceed to flow toward the weld at the panel and stud interface by reason of the greater heat present in that area. Other portions of the molten plastic flow through the fissures and the cracks in the internal plating created by the earlier mentioned shearing of the nibs 11 and this plastic is squeezed inwardly toward the core portion 13 of the stud between flanges 17 and 18. With the attachment thus completed, as will be described in further detail hereinafter, the vacuum pump is deenergized thereby removing the load and the fixture is withdrawn from the panel surface. The total time required to effect the attachment of the trim member is approximately two seconds.

Those having familiarity with the art of resistance welding will realize that when the initial high intensity weld current is cut off the heat in the autogenous pool of metal formed from the molten forward end of the stud and the molten localized area of the panel dissipates almost instantaneously through the remaining mass of the panel which acts as an enormous heat sink, and the pool solidifies so that the actual welded joint is created at that point in the process. Therefore, when the post weld, lower intensity current is applied, the heat generated travels mainly through the flange 16 and the seated portions of the stud. The intensity of the post weld current is therefore predetermined for a level which is not sufficiently high enough to precipitate further melting of the stud. However, the heat which is generated in the stud during post weld current flow is sufficient to cause additional or continuing localized melting of the plating and plastic with the latter being maintained at a temperature below its boiling point.

As was earlier mentioned, the post weld current is programmed for a flow of about six cycles, after which it is automatically cut off. Shortly after the flow of post weld current ceases, the stud plunges and fractures the plating. The precise instant at which the stud will plunge will, of course, vary between assemblies as that occurrence will, to some degree, be affected by variations in plating thicknesses, variations in the thermal conductivity of the studs and other factors. In this respect it is significant to note that repeated sample testing of trim attached according to the procedures set forth above has indicated that an early interruption of post weld current flow has an almost negligible effect on the overall strength of the attachment. The last mentioned point is best clarified by specifically citing test data compiled with relation to a number of sample attachments wherein the time of post weld current flow was observed as being continuous through a full six cycles in certain instances and less than that optimum period in other instances.

With the trim piece welded to a typical auto body panel, a force in shear was applied perpendicular to the long axis of the letter toward the individual stud connections. The results indicated that the connection of an individual stud to the trim piece would withstand a force on the order of 210 lbs. before the stud would begin to pull free from the letter. When a torque test was applied to the assembly by gripping the trim and applying a violent twisting force to it, a force on the order of 300 lbs. was required to cause a cracking of the trim piece and bending of the studs. A test in shear wherein the force was applied perpendicular to the side of the letter indicated that a force on the order of 360 lbs. was required to dislodge the studs from the trim piece. A lift-off test where the trim pieces were grasped adjacent individual stud seats and pulled axially away from the panel indicated that the connection would withstand a pull on the order of 100 lbs. before yielding and, after the trim piece was removed, a force of approximately 300 lbs. was required to pull the studs from the panel. All of these test results indicate that trim assembly attachments according to the invention are capable of withstanding forces well in excess of those dictated by current automobile industry standards for exterior trim attachments.

Before proceeding to a detailed description of the final assembly condition of the trim piece and the panel, it is deemed appropriate to point out that the above very detailed description of the welding process is simply illustrative of one proven method for effecting the attachments, and it is contemplated that refinements and improvements in that process might be made by those skilled in the art within the scope of the invention as defined by the claims appended hereto. For example, it would be considered well within the scope of the invention for one to fabricate the plastic substructure of the trim piece from a material which could readily withstand the heat generated by the high intensity welding current for a time period substantially in excess of three cycles and thereby remain in a below boiling molten state so that the entire welding operation could be carried out without cutting off the high amperage current for a cool period or later applying a low intensity current to complete the welding process.

The reader should now refer to FIGS. 5 and 6 which clearly depict a final welded trim installation according to the invention. As is readily observed the trim member or letter 1 is secured flush against a painted surface 24 of the supporting panel. The autogenous weld joint 26 is completely concealed thereby rendering the attachment attractive from an esthetic point of view. The thermoplastic material which was squeezed through the plating fissures during the welding process earlier described has resolidified and formed a sealing, corrosion inhibiting ring 27 about the weld joint adjacent the surface of the panel area from which the protective paint coat was displaced during the welding operation. As a result of the stud plunge the flange 16 is disposed within the body portion of the substructure 2 and its surface confronting the panel 23 lies flush with the adjacent plating 3 on the trim member. The plastic material of the substructure has enveloped the core portion 13 of the stud so that the flange 18 is in effect encapsulated in the redefined cavity in the substructure. This envelopment and encapsulation provides considerable strength in the assembly and high resistance to separation of the trim piece from the stud as was evident from the earlier discussion of the relevant shear, torque and pull test data.

Having read the foregoing detailed description, the reader should now be cognizant of the fact that the objective of further advancing the art of trim design and attachment has been realized.

The reader should also fully understand that the detailed description of the improved product and processes was intended to be illustrative and not limiting in nature. Therefore, for a determination of the scope of the invention which is protected by these letters patent, one should now have reference to the claims appended hereto.

I claim:

1. An assembly comprising the combination of a trim member having a primarily electrically nonconductive body structure and having a metallic surface capable of conducting a high-amperage electric current and a nonintegral welding stud seated in said body structure of said member and in electric current carrying contact with said metallic surface of said member, said welding stud embodying means adapted to make effective electric current carrying contact with a metallic supporting structure when said stud is pressed against such a structure, whereby current from an electrode placed in contact with said surface of said trim member will flow from said member to said welding stud and to a supporting structure so that an electrical welding of said trim member to the structure may be effected, absent any appreciable change in the external configuration of said trim member incident to the welding operation.

2. An assembly according to claim 1 wherein said trim member comprises an electrically nonconductive body structure and an electrically conductive metallic surface coating applied to said body structure.

3. An assembly according to claim 1 wherein said trim member comprises a body structure of molded synthetic resinous material and successive layers of copper, nickel and chrome plated on said body structure.

4. An assembly according to claim 1 wherein said welding stud includes a lateral projection which overlies a portion of the metallic surface of said trim member in electric current carrying contact therewith.

5. An assembly according to claim 4 wherein said welding stud includes a central core of generally circular cross section and said projection is a flange of generally circular configuration circumscribing said core and of greater diameter than said core.

6. An article of manufacture comprising, in combination, a member to be attached to a metallic support and to substantially retain its preattached external configuration subsequent to the attachment, said member including a substructure formed from an electrically nonconductive material and a metallic coating on the external surface of said substructure, said coating being characterized by its capacity for conducting an electric current of sufficiently high amperage to effect a weld, and a metallic welding stud, said welding stud having portions thereof seated in said substructure and other portions thereof extending outwardly from said substructure and beyond the surface of the member which will confront a metallic support subsequent to the attachment, said welding stud being in effective electric current carrying contact with said coating, the last mentioned portions of said welding stud terminating in a free end which is particularly adapted for establishing current carrying contact with a metallic support when said welding stud is pressed against the support, whereby said member is adapted to be attached to a metallic support by welding said welding stud to the support with the said coating on said member acting as a conductor of electric current, from a current supply electrode placed in contact with said member, to said welding stud and the support during the welding operation.

7. An article of manufacture according to claim 6 wherein the portions of said welding stud seated in said substructure of said member embody means adapted to be grippingly engaged by the material forming said substructure during the process of welding said article to a support.

8. An article of manufacture according to claim 6 wherein said substructure of said member has a cavity formed therein, said cavity having an open end adjacent an external surface of said substructure, and portions of said welding stud are seated in said cavity.

9. An article of manufacture according to claim 8 wherein the internal walls of said substructure of said member defining said cavity are metallically coated and the portions of said welding stud seated therein make effective electric current carrying contact with said metallically coated walls.

10. An article of manufacture according to claim 9 wherein a plurality of nibs project from the walls of said cavity toward the central portion thereof and said nibs are at least partially formed from said metallic coating.

11. An article of manufacture according to claim 8 wherein said cavity is countersunk to provide a portion of reduced width inwardly of the open end thereof and a portion of greater width adjacent the open end thereof and thereby defining a ledge spaced inwardly from the open end of said cavity.

12. An article of manufacture according to claim 11 wherein the portions of said welding stud seated within said cavity include a laterally extending flange seated in said portion of said cavity of greater width and having an undersurface overlying said ledge.

13. An article of manufacture according to claim 8 wherein the portions of said welding stud extending outwardly of said member include a laterally extending flange, said flange having an undersurface overlying said external coated surface adjacent the open end of said cavity.

14. An article of manufacture according to claim 8 wherein the depth of said cavity and the length of said portions of said welding stud seated therein are selected so that the end of said welding stud remote from said free end lies spaced from the base of said cavity.

15. An article of manufacture according to claim 8 wherein said portions of said welding stud extending outwardly of said member include a laterally extending flange having an undersurface overlying the said coated external surface adjacent the open end of said cavity, the depth of said cavity and the length of said welding stud portion seated within said cavity being selected so that the end of said welding stud remote from its free end lies spaced from the base of said cavity, and the spacing of said welding stud end from the base of said cavity is approximately equal to the thickness of said flange.

16. An article of manufacture according to claim 8 wherein said welding stud includes a central core partially seated within said cavity and partially extending outwardly beyond the coated surface of said substructure of said member adjacent the open end of said cavity, the last mentioned portion of said core terminating in a sharply pointed free end, a first flange projecting laterally from said central core and overlying said coated external surface adjacent the open end of said cavity, a second flange projecting laterally from said core and being disposed adjacent the surface of said first flange most remote from said free terminal end of said core and having a width less than the width of said first flange and being seated in said cavity adjacent the open end thereof, and a third flange extending laterally from the end of said core most remote from said free terminal end, said third flange being in axially spaced relationship with respect to said first and second flanges and having a width less than said first and second flanges and being spaced from the base of said cavity, the peripheral edges of said second and third flanges being snugly butted against the internal walls of said cavity, and the portion of said central core intermediate said second and third flanges being laterally spaced from the walls of said cavity.

17. An installation comprising in combination a trim member welded to a supporting metallic structure, said trim member including a body structure formed from an electrically nonconductive, corrosion resistant material and a metallic plating on the external surface of said body structure, said plating being characterized by its capacity for conducting an electric current of sufficiently high amperage to effect a weld, a welding element having a portion thereof embedded within said body structure of said trim member and another portion thereof fixed to said supporting structure in an autogenous joint, and a pellicle of noncorrosive material covering a localized area of said supporting structure adjacent said joint, said pellicle of material having emanated from said body structure of said trim member during the process of welding the trim member to said supporting structure.

18. An installation according to claim 17 wherein said body structure of said trim member is molded from a synthetic thermoplastic material.

19. An installation according to claim 18 wherein the portion of said welding element embedded within said body structure embodies means which are grippingly engaged by the synthetic plastic material of said body structure, which material was displaced into such gripping engagement during the process of welding the trim member to said supporting structure.

20. An installation according to claim 18 wherein said body structure has a cavity preformed therein, the portion of said welding element embedded in said body structure is seated in said cavity, said portion of said welding element includes a central core and at least a pair of axially spaced flanges extending laterally from said core, and the section of said core between said flanges is tightly enveloped by a band of synthetic thermoplastic material, which band emanated from the walls of said body structure defining said cavity during the process of welding said trim member to said supporting structure.

21. A method of constructing an article of manufacture which is particularly adapted to be welded to a metallic supporting structure comprising the steps of:
 a. forming the substructure of a member constituting one component of the article from an electrically nonconductive material having an open-ended cavity therein;
 b. plating the external surfaces of the substructure of the member with a material which is characterized by its capacity for conducting an electric current of sufficiently high amperage to effect a weld; and
 c. seating a metallic stud, which constitutes a second component of the article and which is particularly adapted for establishing effective electric current carrying contact with a surface of a metallic supporting structure, in the cavity in said coated substructure of the member in such a manner that said stud:
  1. is retained in assembly with the said member absent the need for the continued application of an external retaining force thereon;
  2. makes effective electric current carrying contact with the said coating material; and
  3. projects an appreciable distance outwardly beyond the surface of the member which will confront a supporting structure during the welding operation.

22. The method according to claim 21 comprising the additional step of:
 d. plating the internal surfaces of the substructure of the member defining the cavity with an electrically conductive material.

23. The method according to claim 21 comprising the additional steps of:
 d. selecting a metallic stud having opposite end portions and an intermediate laterally extending projection;
 e. seating one of the end portions in the cavity to the extent that the projection is butted against the plated surface of the member which will confront a supporting structure and lies adjacent the open end of the cavity; and
 f. predetermining the depth of the cavity and the axial length of said one-end portion of the stud so that the said one-end portion, when seated, will lie spaced from the base of the cavity.

24. The method of attaching an article of manufacture to a metallic supporting structure wherein the article comprises the combination of a trim member which will substantially retain its preattached external configuration subsequent to the effecting of the attachment, said trim member having a metallic surface capable of conducting an electric current and a welding element joined to the member and in electric current carrying contact therewith, the welding element embodying means adapted to make effective current carrying contact with the supporting structure, including the steps of:
 a. bringing the trim member into close proximity to the supporting structure;

b. evacuating air from the atmosphere in the immediate environment of the trim member to create a vacuum adjacent the surface of the supporting structure to which the member is being attached and thereby applying an axial load directly to the trim member to press the said means on the welding element firmly against the supporting structure to establish electric current carrying contact therewith; and while thus maintaining the trim member and the welding element under load c. applying a localized electric current from a supply electrode directly to the surface of the trim member, which current flows from the trim member to the welding element and to the supporting structure and precipitates a melt at the interface of the element and the structure; and d. cutting off the current flow while continuing to maintain the trim member under load for a time sufficient to allow the molten material of the welding element and the supporting structure to cool and solidify into an autogenous joint.

25. A method of welding a composite article to a metallic support and simultaneously effecting a seal at a localized area of the support adjacent the weld, wherein the article comprises a member having a synthetic thermoplastic body structure with an open-ended cavity formed therein and a metallic plating on the external surfaces of said body structure, and a metallic stud having one end seated in the cavity but spaced a predetermined distance from the base of the cavity, an opposite end protruding outwardly from the cavity and having a substantially pointed terminus which is particularly adapted for establishing effective electric current carrying contact with a metallic support and a laterally extending peripheral flange intermediate the ends of the stud which overlies the plated surface of the member adjacent the open end of the cavity, including the steps of:

a. applying an axial load on the article to press the pointed terminus of the stud into metal-to-metal contact with the support and the flange into effective electric current carrying contact with the plated surface of the member; and while continuing to apply the load b. applying a relatively high amperage electric current to the plating on the member, which current flows through the plating to the stud and the support and precipitates an overall heating of the stud, a melt at the interface of the stud and the support, and a localized heating and melting of the thermoplastic of the body structure adjacent the stud, while the continuing applicatiion of the load forces the stud into the body structure toward a condition where the seated end of the stud bottoms on the base of the cavity and the flange is pressed into the body structure causing fissures in the plating adjacent the open end of the cavity and allowing the molten plastic to flow outwardly about the interface melt; and while continuing to maintain the load c. cutting off the current flow to allow the interface melt to cool and harden into an autogenous joint and the molten plastic to cool and resolidify, whereby the article is welded to the support, the seated end of the stud is enveloped by the resolidified plastic material of the body structure, and the localized area of the support adjacent the weld is sealed by the resolidified plastic material which escaped through the fissures in the plating; and d. removing the load.

26. The method of attaching an article comprising a metallically-plated thermoplastic trim member to a metallic support wherein the member has a metallic means joined thereto and projecting outwardly therefrom which is particularly adapted for establishing effective metal-to-metal contact with the support and said means is in contact with the metallic plating on said member, including the steps of:

a. engaging the said means with the support under the influence of an axial load applied to the trim member and the means to establish good metal-to-metal contact with the support; and while maintaining the article under load b. applying current from a supply electrode to the metallic plating on the trim member, which current traverses the electrically conductive path from the plating, through the said means to the support and precipitates a hot melt at the interface of the means and the support thereby creating a localized pool of molten metal from the said means and the support, which pool of metal cools and solidifies to a welded joint when the flow of current from the source is interrupted.

27. The method according to Claim 26 wherein said metallic means includes a lateral projection disposed externally of said trim member but in current carrying contact with said plating and wherein the step of applying the axial load to the trim member includes pressing said projection axially into said trim member to precipitate a fissuring of the plating, and the step of applying a current includes a heating of said means and a heating and localized melting of the thermoplastic material adjacent said means, whereby portions of the molten plastic are caused to flow outwardly through the fissures under the continuing influence of the load, which portions of plastic material resolidify when the current is interrupted and form a seal at a localized area of the support adjacent the welded joint.

28. In an article of manufacture, the combination comprising a member having a body structure primarily formed from an electrically nonconductive material, and a metallic welding stud having certain portions thereof seated in the portions of said body structure formed from the nonconductive material and other portions thereof extending outwardly beyond a surface of said member, the last mentioned portions of said welding stud terminating in a free end which is particularly adapted for establishing effective electric current carrying contact with the surface of a metallic supporting structure when the said element is pressed against such a structure, said welding stud having means for conducting electric current from a supply electrode to the said free end of said element whereby said said stud is adapted to be electrically welded to a metallic supporting structure to secure the said member to the structure, and said welding stud having means adapted to precipitate a localized melting of the nonconductive material of said body structure of said member and a localized displacement of the molten material during the welding operation, whereby the displaced material will form a seal about a weld joint at the surface of the supporting structure confronting the secured member.

29. In an article of manufacture which is adapted to be secured to a supporting structure by a welding process, the combination comprising a member having a body structure which is at least partially formed from an electrically nonconductive, corrosion resistant material, said body structure having a bore formed therein, and a metallic welding stud having a first portion thereof seated in the bore in said body structure and a second portion thereof protruding out of said bore and beyond a first external surface of said member, the last mentioned portion of said welding stud terminating in a free end which is particularly adapted for establishing effective electric current carrying contact with the surface of a metallic supporting structure when said stud is pressed against such a structure, said welding stud having means for conducting electric current from a supply electrode to the said free end of said stud whereby said stud is adapted to be electrically welded to a metallic supporting structure responsive to the application of a welding current to said stud, the length of the portion of said welding stud seated in the bore in said body structure being less than the length of said bore so that the end of said portion is spaced from the end of said bore most remote from the said first external surfaces of said member, whereby said welding stud is adapted to be driven further into said member toward the end of said bore most remote from said first external surface of said member responsive to the application of an axial load to the member during the process of securing same to a supporting structure.

30. The combination according to claim 29 wherein said welding stud includes means adapted to displace portions of the electrically nonconductive, corrosion resistant material forming said body structure when said welding stud is driven further into said bore.

31. In an article of manufacture which is adapted to be secured to a supporting structure by a welding process, the combination comprising a member having a body structure which is at least partially formed from an electrically nonconductive, corrosion resistant material, said body structure having a bore formed therein, and a metallic welding stud having a first portion thereof seated in the bore in said body structure and a second portion thereof protruding out of said bore and beyond a first external surface of said member, the last mentioned portion of said welding stud terminating in a free end which is particularly adapted for establishing effective electric current carrying contact with the surface of a metallic supporting structure when said stud is pressed against such a structure, said welding stud having means for conducting electric current from a supply electrode to the said free end of said stud whereby said stud is adapted to be electrically welded to a metallic supporting structure responsive to the application of a welding current to said stud, and said welding stud having a laterally extending projection overlying said first external surface of said member, which projection is adapted to be pressed into the body structure of the member adjacent the said bore responsive to the application of an axial load to the member during the process of securing same to a supporting structure.

32. An installation comprising, in combination, a member welded to a supporting metallic structure, said member having a body structure primarily formed from an electrically nonconductive, corrosion resistant material, a welding stud having a portion thereof fixed to said member and another portion thereof joined to said supporting structure in an autogenous joint, and a pellicle of corrosion resistant material covering a localized area of said supporting structure adjacent said joint and providing a seal in said area, said material providing said seal having emanated from the corrosion resistant material of said body structure of said member during the process of fusing said welding stud to said supporting structure.

33. A method of attaching a member which is at least partially formed from a solidified plastic material to a metallic support wherein the member has a metallic means secured thereto and projecting outwardly therefrom, which means is particularly adapted for establishing effective metal-to-metal contact with the support, including the steps of
   a. engaging the said means with the support under the influence of an axial load on the means to establish good metal-to-metal contact with the support; and while maintaining the means under load
   b. applying electric current from a supply electrode to the means to weld the said means to the support;
   c. pressing the member toward the support and the weld joint to precipitate the displacement of a localized portion of the plastic material of the member; and thereby
   d. forming a corrosion resistant coating on the surface of the support adjacent the weld joint utilizing the displaced plastic material.

34. An assembly comprising the combination of a member which is capable of conducting a high amperage electric current, a welding element joined to said member and in electric current carrying contact therewith, said welding element embodying means adapted to make electric current carrying contact with a metallic supporting structure when said element is pressed against such a structure and into effective electric current carrying contact with the structure, whereby current from an electrode placed in contact with said member will flow from said member to said welding element and to the supporting structure engaged by said means on said element so that an electrical welding of said member to the structure may be effected, and means for effecting a seal about the weld joint at the surface of the supporting structure confronting the member, said means being in the form of a thermoplastic resinous substance which is disposed about said welding element prior to the welding operation and is adapted to be displaced responsive to the welding of the element to the supporting structure.

35. The combination according to claim 34 wherein said thermoplastic sealing means derives from the substructure of said member.

36. An installation comprising, in combination, a trim member joined to a supporting metallic structure, said trim member including a body structure formed from an electrically nonconductive corrosion resistant material and a metallic plating on the external surface of said body structure, a connecting element having a portion thereof embedded within said body structure of said trim member and another portion thereof fixed to said supporting structure in an autogenous joint, and a pellicle of noncorrosive material covering a localized area of said supporting structure adjacent said joint, said pellicle of material having emanated from said body structure of said trim member during the process of joining said trim member to said supporting structure.

37. A resistance welding part structure comprising, an electrically nonconductive body having an adjacent surface for fixedly abutting a base and a remote surface for removably abutting a welding machine part such as a press-platen, a current-conducting welding projection on said body extending from said adjacent surface for welding contact with a base, and a current-conducting member carried by said body leading from said remote surface to said projection on said adjacent surface;

said structure when positioned between a metal base and a press-platen, which are connected in a welding circuit, being weldable on the base by transferring current between the press-platen and the base to said projection at the base via said conducting member to conduct current past said nonconductive body to said projection and to fuse said projection to the base in conjunction with the welding cycle of the welding circuit and the advancing movement of the press-platen, said current-conducting member being an electrically conductive coating layer on said body.

38. In a device as set forth in claim 37, a bead on said adjacent surface of said body at least partially around said projection; said bead acting as a containing wall for material melting from the heat of welding.

39. In a device as set forth in claim 37, a ring-bead at least partially around said projection of at least a surface layer of electrical conducting material constituting a welding stud for welding against the metal base.

* * * * *